United States Patent [19]

Caywood, Jr.

[11] Patent Number: 4,673,715

[45] Date of Patent: Jun. 16, 1987

[54] FLUOROELASTOMER COMPOSITION CONTAINING ACCELERATOR

[75] Inventor: Stanley W. Caywood, Jr., Wilmington, Del.

[73] Assignee: E. I. Du Pont de Nemours and Company, Wilmington, Del.

[21] Appl. No.: 901,002

[22] Filed: Aug. 27, 1986

Related U.S. Application Data

[62] Division of Ser. No. 758,716, Jul. 25, 1985.

[51] Int. Cl.$^4$ ................................................ C08F 8/40
[52] U.S. Cl. ................................ 525/340; 525/326.2; 525/326.3; 525/326.4; 264/337
[58] Field of Search ................ 525/340, 326.2, 326.3, 525/326.4; 264/337

[56] References Cited

U.S. PATENT DOCUMENTS

| | | | |
|---|---|---|---|
| 3,652,735 | 3/1972 | Hechenbleikner | 260/926 |
| 3,712,877 | 1/1973 | deBronner | 525/326.3 |
| 3,876,654 | 4/1975 | Pattison | 260/30.4 R |
| 3,884,877 | 5/1975 | Kolb | 525/326.3 |
| 4,489,196 | 12/1984 | Schmiegel | 525/326.3 |
| 4,501,858 | 2/1985 | Moggi | 525/340 |
| 4,568,716 | 2/1986 | Dorencsenyi | 524/520 |

*Primary Examiner*—Paul R. Michl
*Assistant Examiner*—Bernard Lipman

[57] ABSTRACT

A fluoroelastomer composition comprising (a) a fluoroelastomer comprising vinylidene fluoride units and units of at least one other fluorine-containing monomer copolymerizable with vinylidene fluoride, said monomer containing 2-7 carbon atoms and containing at least as many fluorine atoms as carbon atoms, and (b) a phosphonate accelerator for curing the fluoroelastomer having the formula:

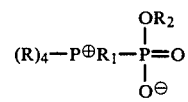

where R, $R_1$ and $R_2$ independently represent an alkyl radical of from 1-8 carbon atoms, a phenyl radical, a phenyl radical substituted with an alkyl group of 1-4 carbon atoms or an aralkyl radical having from 7-13 carbon atoms such fluoroelastomer composition substantially reduces mold fouling during curing.

12 Claims, No Drawings

FLUOROELASTOMER COMPOSITION CONTAINING ACCELERATOR

This is a division of application Ser. No. 758,716, filed July 25, 1985.

BACKGROUND OF THE INVENTION

This invention relates to a fluoroelastomer composition containing a phosphonate accelerator for curing the fluoroelastomer.

Fluoroelastomers containing units of vinylidene fluoride and other fluorine-containing monomers, such as hexafluoropropylene with or without tetrafluoroethylene, that are cured with quaternary phosphonium accelerators which are alkyl- or aralkyl triarylphosphonium compounds, for example, benzyltriphenyl phosphonium chloride, in combination with a crosslinking agent, such as a Bisphenol, and a basic metal oxide or hydroxide, have been known for many years. The vulcanizates of such compositions possess excellent physical properties and resistance to environmental attack and are used to manufacture such articles as gaskets, O-rings, wire insulation, hoses, etc. Unfortunately, however, the curable fluoroelastomers containing quaternary phosphonium accelerators of the type described above cause mold fouling. Mold fouling is a process by which metal molds are contaminated by the curable fluoroelastomer stock that is to be molded or by its degradation products during the curing or vulcanization process. When the cured fluoroelastomer composition has been removed from the mold cavity, a black deposit which appears to be fluoroelastomer stock is observed adhering to the surface of the metal mold cavity. After as few as twenty-five molding cycles, the amount of fouling of the mold cavity may be sufficient to be weighed with a microbalance. Mold fouling during curing of the fluoroelastomers eventually requires the fabricator to shut down the mold line so that the mold can be cleaned; otherwise, the molded articles have a rough, uneven surface. Metal corrosion is believed to be a factor in mold fouling. It is believed that acids which are given off during conventional curing of vinylidene fluoride-containing fluoroelastomer compositions can cause micro-cracking, even in mold cavities made of austenitic stainless steel, and fouling soon follows. The present invention provides novel fluoroelastomer compositions containing phosphonate accelerators for curing the fluoroelastomers. The phosphonate accelerators substantially reduce mold fouling when the elastomers are cured in steel mold cavities. At the same time, the use of these accelerators in the fluoroelastomers does not compromise the important physical properties of the elastomers, such as compression set resistance, percent elongation at break, and tensile strength at break. Furthermore, the phosphonate accelerators used in the present invention provide cure rates which permit commercially feasible rates of production of fluoroelastomer parts.

SUMMARY OF THE INVENTION

The present invention is directed to a fluoroelastomer composition comprising (a) a fluoroelastomer, comprising vinylidene fluoride units and units of at least one other fluorine-containing monomer copolymerizable with vinylidene fluoride, said monomer containing 2-7 carbon atoms and containing at least as many fluorine atoms as carbon atoms, and (b) a phosphonate accelerator for curing the fluoroelastomer having the formula:

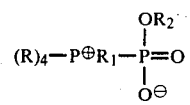

where R, $R_1$ and $R_2$ independently represent an alkyl radical containing 1-8 carbon atoms, a phenyl radical, a phenyl radical substituted with an alkyl group having 1-4 carbon atoms or an aralkyl radical containing 7-13 carbon atoms.

The fluoroelastomer is cured by heating, at a temperature of from about 150°-220° C. for 0.2-30 minutes in a steel mold cavity, a fluoroelastomer composition comprising a fluoroelastomer having vinylidene fluoride units, and units of at least one other fluorine-containing monomer copolymerizable with vinylidene fluoride, said monomer containing 2-7 carbon atoms and containing at least as many fluorine atoms as carbon atoms, and a phosphonate accelerator for the fluoroelastomer having the formula given hereinabove.

DETAILED DESCRIPTION OF THE INVENTION

The fluoroelastomers that can be used in combination with the phosphonate accelerators to make curable compositions contain vinylidene fluoride units and, in addition, contain units from at least one other fluorine-containing monomer copolymerizable with vinylidene fluoride, said monomer containing 2-7 carbon atoms and containing at least as many fluorine atoms as carbon atoms. Representative fluorine-containing monomers that are incorporated in the fluoroelastomer include units from hexafluoropropylene, pentafluoropropylene, and perfluoroalkyl perfluorovinyl ether where the alkyl group usually contains 1-5 carbon atoms. Preferred combinations of fluoroelastomers include units of vinylidene fluoride and hexafluoropropylene or pentafluoropropylene, optionally containing units of tetrafluoroethylene. The fluoroelastomers that are generally used in the compositions of this invention are fluoroelastomers containing at least about 30% by weight vinylidene fluoride units. Usually such fluoroelastomers contain about 30-70 weight percent vinylidene fluoride units, about 20-50 weight percent hexafluoropropylene units or pentafluoropropylene units or perfluoromethyl perfluorovinyl ether units and about 3-35 weight percent tetrafluoroethylene units. The fluoroelastomers can contain up to 3 mole percent of units of a bromine-containing olefin such as bromotrifluoroethylene, bromodifluoroethylene, 4-bromo-3,3,4,4-tetrafluorobutene-1, etc. These and other fluoroelastomers that can be used in the present invention are described in U.S. Pat. Nos. 3,051,677, 2,968,649 and 4,123,603 the disclosures of which are incorporated herein by reference.

The compounds used as accelerators for increasing the curing rate of the fluoroelastomers and that prevent mold fouling are phosphonates having the formula:

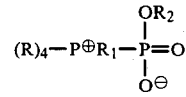

where R, $R_1$ and $R_2$ are independently alkyl radicals containing 1-8 carbon atoms, a phenyl radical, a phenyl radical substituted with an alkyl group having 1-4 carbon atoms or an aralkyl radical containing 7-13 carbon atoms. Preferably the phosphonate accelerators have the formula:

where R, $R_1$ and $R_2$ are alkyl radicals of 1-8 carbon atoms, most preferably methyl radicals, i.e., methyltriphenylphosphonium methyl methanephosphonate (MTP). Representative phosphonate accelerators that can be used in the present invention include: methyltrioctylphosphonium methyl methanephosphonate, methyltributylphosphonium methyl methanephosphonate, ethyltributylphosphonium methyl hexanephosphonate, methyltriphenylphosphonium methyl methanephosphonate, dibutyldiphenylphosphonium ethyl propanephosphonate, ethylbutyldiphenylphosphonium methyl ethanephosphonate, methyltriethylphosphonium methyl benzenephosphonate, methyltributylphosphonium ethyl 4-methylbenzenephosphonate, tetramethylphosphonium butyl 2-methyl-5-isopropylphosphonate, benzyltrimethylphosphonium methyl methanephosphonate, benzyldibutylmethylphosphonium methyl ethanephosphonate, methyltributylphosphonium methyl phenylmethanephosphonate, methyltriphenylphosphonium ethyl benzenephosphonate, and methyltribenzylphosphonium methyl propanephosphonate. Methyltriphenylphosphonium methyl methanephosphonate is especially preferred.

The amount of phosphonate accelerator usually present in the fluoroelastomer is from about 0.1-2.0 parts by weight per hundred parts by weight fluoroelastomer, preferably about 0.3-1 parts by weight per hundred parts by weight fluoroelastomer. If the fluoroelastomer composition contains much more than about 2 parts by weight phosphonate accelerator per hundred parts by weight fluoroelastomer it can adversely affect the physical properties of the fluoroelastomer, such as lowering its compression set resistance. If the fluoroelastomer contains much less than about 0.1 parts by weight phosphonate accelerator per hundred parts by weight fluoroelastomer then the cure rate is too slow for the economical manufacture of shaped articles.

The phosphonate accelerators can be prepared by reacting a phosphine of the formula

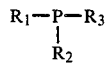

where $R_1$, $R_2$ and $R_3$ are alkyl radicals containing 1-8 carbon atoms, a phenyl radical, a phenyl radical substituted with an alkyl group containing 1-4 carbon atoms, or an aralkyl radical containing 7-13 carbon atoms with a phosphate of the formula

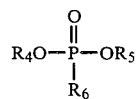

where $R_4$ is an alkyl radical of 1-8 carbon atoms or an aralkyl radical containing 7-13 carbon atoms, $R_5$ and $R_6$ are alkyl radicals containing 1-8 carbon atoms, a phenyl radical, a phenyl radical substituted with an alkyl group containing 1-4 carbon atoms, or an aralkyl radical containing 7-13 carbon atoms. Preferably, the phosphonate accelerators are derived from triphenyl phosphine and the reaction is conducted in a polar solvent such as ethanol. The reaction temperature can range from room temperature to the boiling point of the solvent. The reactants can be present in a mole ratio of 1:1 or with either one in excess. Preferably the phosphate is in excess. The phosphonate accelerators can also be prepared by an ion exchange reaction of the desired anions and cations. These and other representative phosphonates and methods for their preparation are described in U.S. Pat. No. 3,652,735.

It has been found that when the vinylidene fluoride-containing copolymers containing the phosphonate accelerators described above are cured with conventional polyhydroxy aromatic crosslinking agents, such as hexafluoropropylidene-bis(4-hydroxybenzene) (Bisphenol AF), mold fouling is substantially reduced when compared to curing the same fluoroelastomer with conventional curing systems containing, for example, the accelerator benzyltriphenyl phosphonium chloride and a polyhydroxy aromatic compound such as the crosslinking agent bisphenol AF.

Any of the known polyhydroxylic aromatic crosslinking agents that require accelerators for satisfactory cure rates can be added to the fluoroelastomer compositions of the present invention. The crosslinking agent is usually added in amounts of from about 1.0-4 parts by weight per hundred parts by weight fluoroelastomer, usually 2-3 parts by weight per hundred parts by weight fluoroelastomer. Preferred crosslinking agents are di-,tri-, tetrahydroxybenzenes, naphthalenes, anthracenes and bisphenols of the formula:

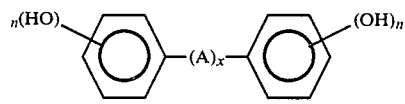

wherein A is a difunctional aliphatic, cycloaliphatic, or aromatic radical of 1-13 carbon atoms, or a thio, oxy, carbonyl, sulfinyl, or sulfonyl radical; A is optionally substituted with at least one chlorine or fluorine atom; x is 0 or 1; n is 1 or 2 and any aromatic ring of the polyhydroxylic compound is optionally substituted with at least one atom of chlorine, fluorine, or bromine, a —CHO group, or a carboxyl or acyl radical (e.g., a —COR where R is OH or a $C_1$-$C_8$ alkyl, aryl, or cycloalkyl group). It will be understood from the above formula describing bisphenols that the —OH groups can be attached in any position (other than number one) in either ring. Blends of two or more such compounds can also be used.

Referring to the bisphenol formula shown in the previous paragraph, when A is alkylene, it can be, for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, pentachloropentamethylene, pentafluoropentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

Other useful crosslinking agents include hydroquinone, dihydroxybenzenes such as catechol, resorcinol, 2-methyl resorcinol, 5-methyl resorcinol, 2-methyl hydroquinone, 2,5-dimethyl hydroquinone and 2-t-butyl hydroquinone; also 1,5-dihydroxynaphthalene and 9,10-dihydroxyanthracene.

In a preferred composition of the present invention for the manufacture of cured articles mold fouling during curing a fluoroelastomer containing vinylidene fluoride units and hexafluoropropylene units and optionally containing tetrafluoroethylene or perfluoroalkyl perfluorovinyl ether units is substantially reduced when the accelerator is methyltriphenylphosphonium methyl methanephosphonate. The crosslinking agent is usually, and preferably, hexafluoroisopropylidenebis-(4-hydroxybenzene) having the formula

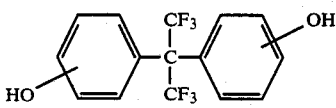

The fluoroelastomer compositions containing the phosphonate accelerators also contain a metal compound of a divalent metal oxide or hydroxide, such as the oxides or hydroxides of magnesium, zinc, calcium or lead; or a mixture of the oxide and/or hydroxide with a metal salt of a weak acid, for example, a mixture containing about 1-20 percent by weight of the metal salt, that are normally used in such curing formulations. Among the useful metal salts of weak acids are barium-, sodium-, potassium-, lead-, and calcium-/-stearate, -benzoate, -carbonate, -oxalate, and -phosphite. The amount of the metal compound added and incorporated in the composition generally is about 1-15 parts by weight per 100 parts by weight of fluoroelastomer, about 2-10 parts being preferred. The metal compound concentration to some extent affects the rate of cure, and if less than about 1 part by weight metal compound per 100 parts by weight fluoroelastomer is used, the cure rate is slow and not especially economical. If more than 15 parts by weight metal compound per 100 parts by weight fluoroelastomer is used, the elastic properties of a cured fluoroelastomer are somewhat impaired, and it is, therefore, advantageous not to exceed the range of the metal compound.

The metal compound serves a dual purpose. It absorbs certain gaseous and acidic materials which are evolved during vulcanization and can chemically attack and weaken the fluoroelastomer. It also improves long term aging stability. The metal oxide can be compounded with the fluoroelastomer stock either free or as a metal oxide complex or chelate with organic complexing agents and ligands, such as cyclic polyethers, amines, phosphines, ketones, alcohols, phenols, or carboxylic acids.

In preparing the fluoroelastomer to be used in the composition of this invention, it is preferred that the reaction mixture of monomer components also contains a free-radical initiator, and the copolymer-forming reaction is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as sodium lauryl sulfate or ammonium perfluorooctanoate. The surfactant can be selected from those known to be useful in the manufacture of fluoroelastomer. A surfactant can, of course, also be present when using an inorganic initiator. A suitable known chain transfer agent can also be present during the emulsion polymerization reaction, but in many cases this is not preferred.

After completion of the preferred emulsion polymerization reaction, the fluoroelastomer can be isolated from the resulting polymer latex by known methods, for example by coagulation by adding an electrolyte or by freezing, followed by centrifuging or filtering, and then drying the copolymer.

The polymerization reaction can also be carried out in bulk, or in an organic liquid containing an organic free-radical initiator. It is usually preferred that none of the organic liquid present is a chain transfer agent.

During preparation of the fluoroelastomer, the reaction mixture is preferably heated in a reactor which has been flushed with an inert gas at about 50° C.-130° C. under superatmospheric pressure, for example, under a pressure of about 0.7-14 MPa, usually about 3-10 MPa. In some of the most useful procedures, the polymerization is carried out as a continuous process and the reaction mixture has an average residence time in the reactor of about 5 to 30 minutes in some cases and up to 2 or 3 hours in others. Residence time can be calculated by dividing the reactor volume by the volume of latex produced per hour.

The fluoroelastomer used in the process of this invention in the majority of cases will have an inherent viscosity of about 0.01 dl/g or higher, with special preference for an inherent viscosity of about 0.2-1.2 dl/g. Inherent viscosities of the fluoroelastomers can be measured at 30° C. at a copolymer concentration of 0.1% by weight in a solvent composed of 87% by volume of tetrahydrofuran and 13% by volume of N,N-dimethylformamide.

The following examples in which all amounts are by weight unless otherwise specified are illustrative of the invention.

EXAMPLES

The following ASTM test methods were used to determine the physical properties of the fluoroelastomer compositions described in the examples.

Tensile Strength at break ($T_B$) D412-80
Elongation at break ($E_B$) D412-80
Modulus at 100% elongation $z9m_{100}$) D412-80
Compression Set Method B D395-78.

EXAMPLE 1

A fluoroelastomer containing about 45% by weight vinylidene fluoride units, about 30% by weight hexafluoropropylene units, and about 25% by weight tetrafluoroethylene units was compounded with the ingredients listed and in the amounts given below on a conventional two-roll rubber mill at about 25° C. for about 4 minutes. The composition of the example contains the phosphonate accelerator methyltriphenylphosphonium methyl methanephosphonate (MTP). A control experiment contains the same ingredients as the example except the accelerator is benzyltriphenylphosphonium chloride (BTPPC) rather than MTP. The amounts given below are in parts by weight per 100 parts by weight fluoroelastomer (phr).

| Example | | Control | |
|---|---|---|---|
| Fluoroelastomer | 100 | Fluoroelastomer | 100 |
| *BPAF | 1.94 | BPAF | 1.94 |
| MTP | 1.05 | BTPPC | 1.05 |
| Ca(OH)$_2$ | 6.3 | Ca(OH)$_2$ | 6.3 |
| **Maglite D | 3.15 | **Maglite D | 3.15 |
| MT Carbon Black | 26.2 | MT Carbon Black | 26.2 |

*BPAF-hexafluoroisopropylidene-bis(4-hydroxybenzene)
**Maglite D - MgO

Sixty-seven samples of the fluoroelastomer composition of the example containing the phosphonate accelerator MTP, and sixty-seven samples of the control experiment fluoroelastomer composition containing the phosphonium accelerator BTPPC were press cured for 15 minutes at 177° C. in test molds having steel mold cavities. All the test samples of the example were successively tested in one mold cavity, and samples of the control experiment were successively tested in another mold cavity.

After performing sixty-seven mold cycles at 177° C., the surface of each mold cavity was inspected. Visual inspection indicated that the mold cavity containing the composition of the example was clean and not fouled with a black deposit. In contrast, visual inspection of the mold cavity containing the control fluoroelastomer composition indicated that the walls of the mold cavity were rough and fouled with a black deposit.

The compounded fluoroelastomer compositions of the example and the control experiment, described above, were tested for degree of cure by an Oscillating Disc Rheometer (ODR). Results are shown in Table I. After the fluoroelastomer compositions were press cured for 15 minutes at 177° C. and subsequently post-cured for 24 hours in an air oven at 232° C., the samples exhibited compression set and stress/strain properties as shown below in Table I.

TABLE I

| | Example | Control |
|---|---|---|
| ODR Cure: 177° C. for 12 minutes, 1° arc microdie | | |
| $T_s2$ (minutes) | 2.15 | 2.70 |

TABLE I-continued

| | Example | Control |
|---|---|---|
| M$_C$90 N.m | 5.11 | 5.10 |
| t'90 (minutes) | 3.05 | 5.08 |
| Compression Set Resistance (%) | | |
| 70 hours, 200° C. | 21.7 | 24.4 |
| Stress/Strain Properties | | |
| M$_{100}$ (MPa) | 6.6 | 6.0 |
| E$_B$ (%) | 200 | 200 |
| T$_B$ (MPa) | 15.9 | 15.8 |

T$_s$2 is time for torque to increase 0.2 N.m above minimum torque.
M$_C$90 is 90% of the maximum torque obtained.
t'90 is time for torque to increase to 90% of the value reached in 30 minutes.

The physical properties for each of the compositions tested above are substantially equivalent thus indicating that MTP had no adverse effects on properties of the elastomer.

EXAMPLE 2

A 190 g sample of a fluoroelastomer containing 60% by weight vinylidene fluoride units and 40% by weight hexafluoropropylene units was compounded with the following ingredients on a conventional two-roll rubber mill at about 25° C. for about 4 mintues: 60 g MT carbon black, 12 g calcium hydroxide, 6 g magnesium oxide, 7.6 g Curative A (mixture of 48 parts of a 60/40 vinylidene fluoride/hexafluoropropylene polymer, 50 parts Bisphenol AF and 2 parts rice bran wax), 1.33 g processing aid (75% tetramethylene sulfone on Micro-Cel E) and 1.05 methyltriphenylphosphonium methyl methanephosphonate (MTP).

Fifty samples of the fluoroelastomer composition of the example, which contained MTP as the accelerator, were press-cured for 15 minutes at 177° C. in a test mold having a steel mold cavity. All the test samples of the example were successively tested in one mold cavity. After fifty mold cycles at 177° C., the surface of the mold cavity was inspected. Visual inspection indicated that the mold cavity containing the composition of the invention was not fouled with a black deposit.

The samples of the compounded fluoroelastomer composition of the invention were tested for degree of cure by an oscillating disk rheometer (ODR). Results are shown in Table II. After the fluoroelastomer compositions were press-cured at 177° C. for 15 minutes and subsequently post-cured for 24 hours in an air oven at 232° C., the samples exhibited the compression set and stress/strain properties shown in Table II.

TABLE II

| Ingredients | Example |
|---|---|
| Fluoroelastomer | 190 |
| Curative A | 7.6 |
| MT Carbon Black | 60 |
| Ca(OH)$_2$ | 12 |
| MgO | 6 |
| Processing Aid | 1.33 |
| MTP | 1.05* |
| ODR 177° C./12 Minutes | |
| t$_s$2 (minutes) | 2.6 |
| M$_C$90 (N.m) | 4.92 |
| t'90 (minutes) | 3.9 |
| Stress/Strain Properties | |
| M$_{100}$ (MPa) | 6.9 |
| T$_B$ (MPa) | 15.5 |
| E$_B$ (%) | 195 |
| Compression Set 70 hr/200° C. (%) | 19 |

*0.54 by weight per 100 parts by weight fluoroelastomer

The physical properties obtained for the compositions tested above indicating that MTP had no adverse effects on the properties of the elastomer.

I claim:

1. A process for curing a fluoroelastomer which comprises heating, at a temperature of from about 150°–220° C. for about 0.2–30 minutes in a steel mold cavity, a fluoroelastomer composition comprising vinylidene fluoride units, and units of at least one other fluorine-containing monomer copolymerizable with vinylidene fluoride, said monomer containing 2–7 carbon atoms and containing at least as many fluorine atoms as carbon atoms, and a phosphonate accelerator for the fluoroelastomer having the formula:

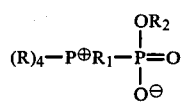

where R, $R_1$ and $R_2$ independently represent an alkyl radical of from 1–8 carbon atoms, a phenyl radical, a phenyl radical substituted with an alkyl group of 1–4 carbon atoms or an aralkyl radical having 7–13 carbon atoms.

2. A process for curing a fluoroelastomer which comprises heating, at a temperature of from about 150°–220° C. for about 0.2–30 minutes in a steel mold cavity, a fluoroelastomer composition comprising vinylidene fluoride units, and units of at least one other fluorine-containing monomer copolymerizable with vinylidene fluoride, said monomer containing 2–7 carbon atoms and containing at least as many fluorine atoms as carbon atoms, and a phosphonate accelerator for the fluoroelastomer having the formula:

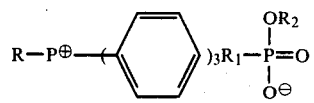

where R, $R_1$ and $R_2$ are alkyl radicals containing 1–8 carbon atoms.

3. A process of claim 2 where R is methyl.

4. A process of claim 2 where $R_1$ is methyl.

5. A process of claim 2 where $R_2$ is methyl.

6. A process of claim 2 where R, $R_1$ and $R_2$ are methyl.

7. A process of claim 6 where the fluorine-containing monomer of the fluoroelastomer contains units of hexafluoropropylene.

8. A process of claim 7 which comprises adding to the fluoroelastomer composition from about 0.1–2 parts by weight phosphonate accelerator per hundred parts by weight of fluoroelastomer.

9. A process of claim 7 where the fluorine-containing monomer of the fluoroelastomer contains units of tetrafluoroethylene.

10. The process of claim 5 where a crosslinking agent that is a polyhydroxylic aromatic compound is added to the fluoroelastomer composition.

11. A process of claim 10 where the crosslinking agent that is added to the fluoroelastomer composition is hexafluoroisopropylidene-bis(4-hydroxybenzene).

12. A process of claim 6 where a basic metal oxide or hydroxide is added to the fluoroelastomer composition.

* * * * *